Patented Mar. 19, 1935

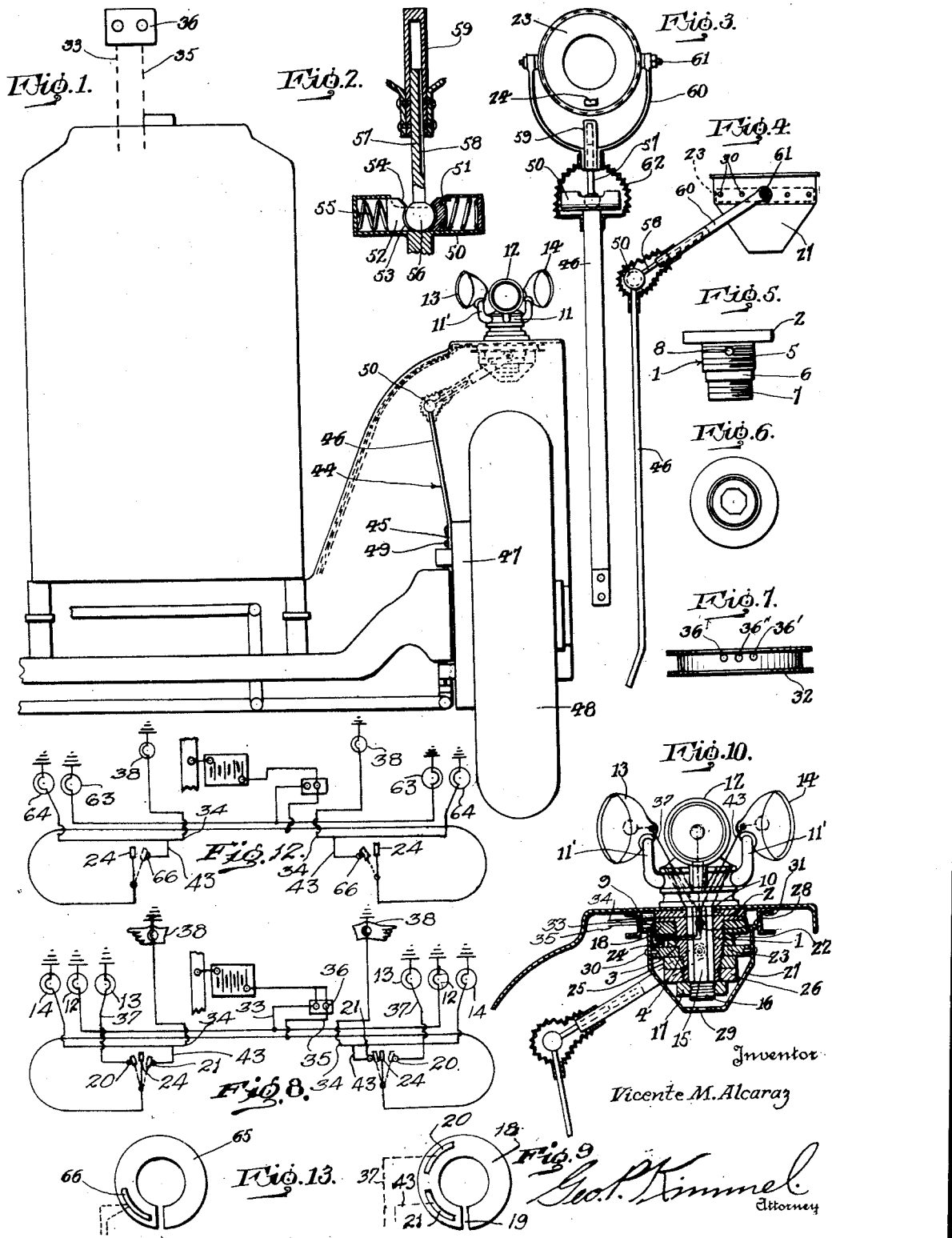

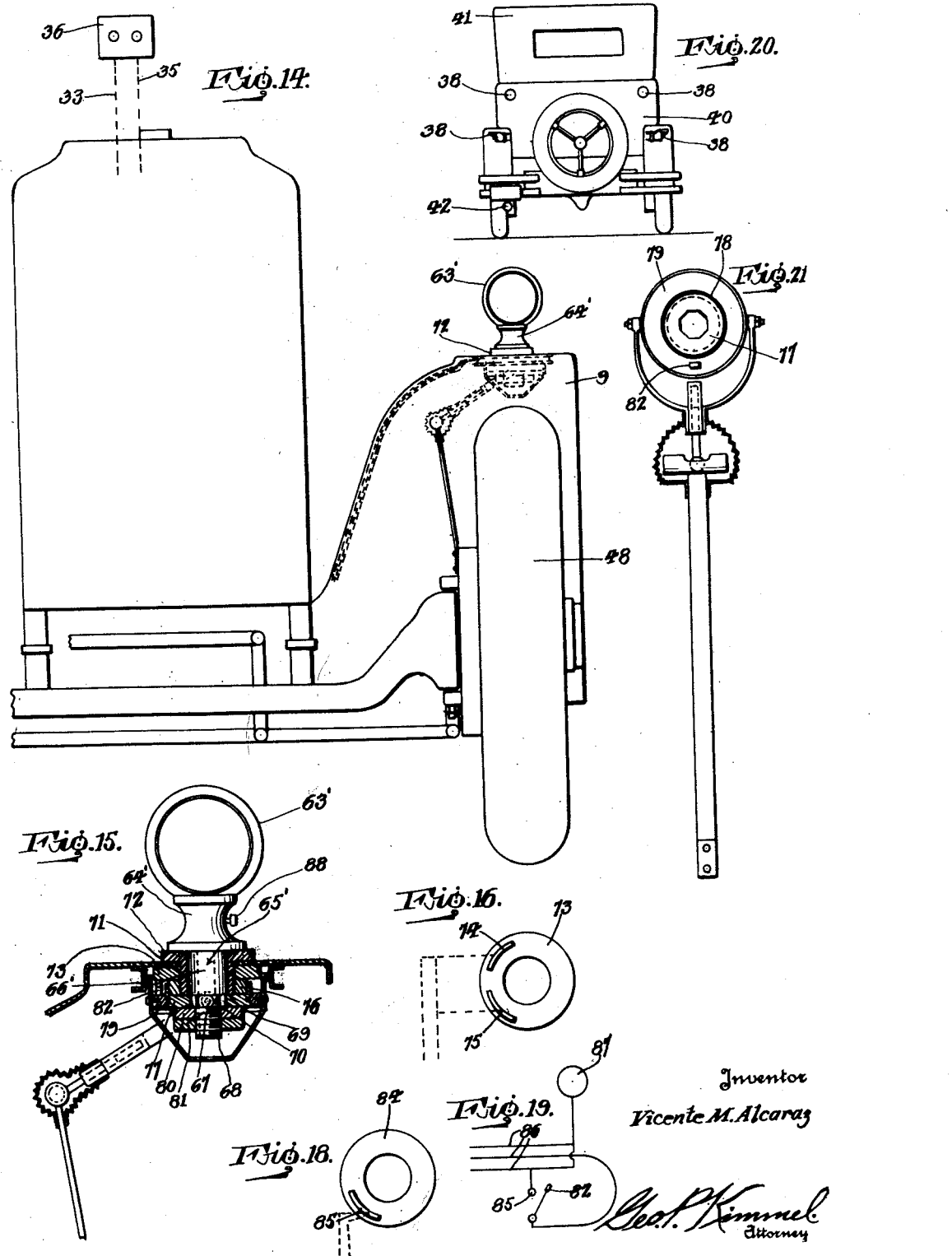

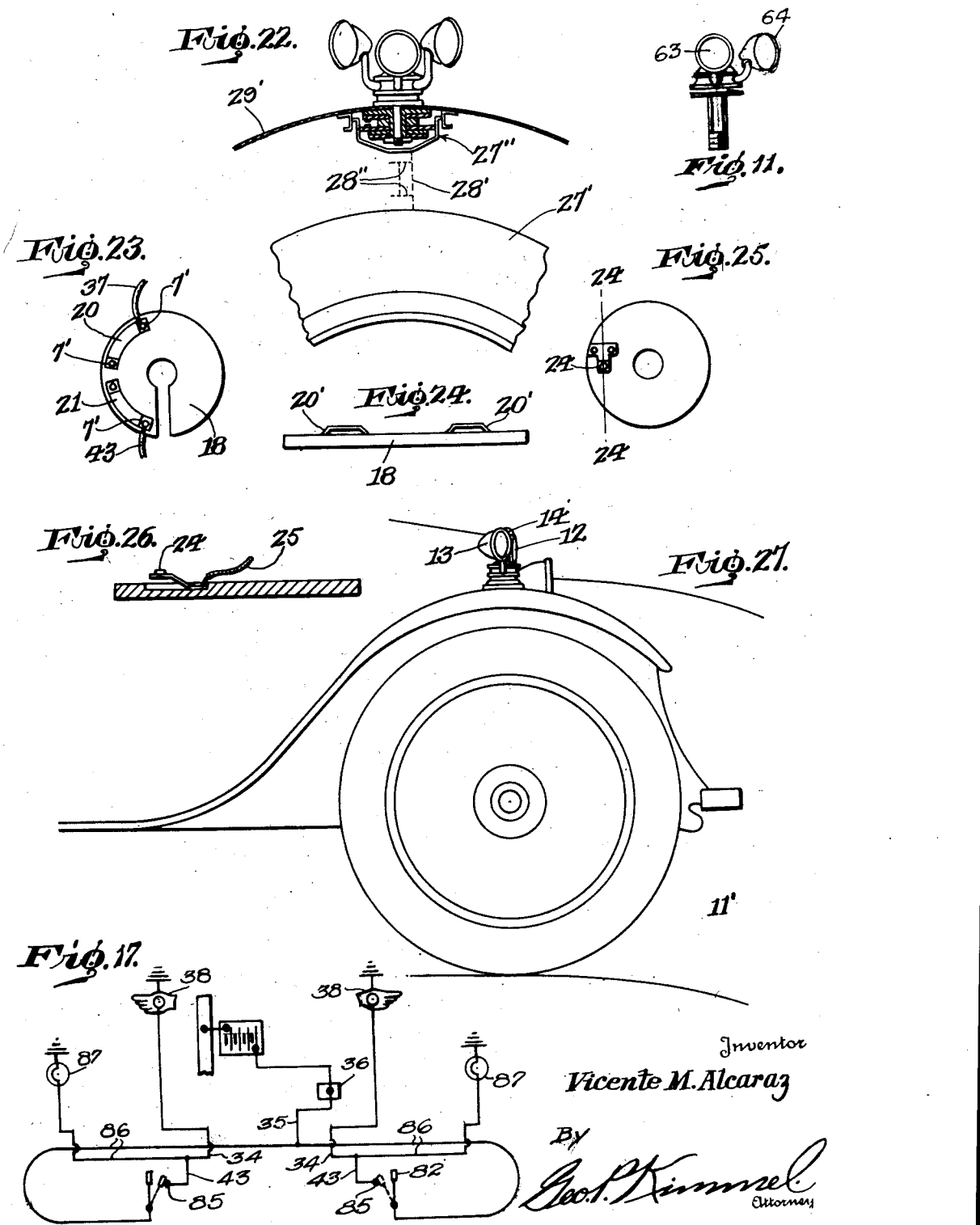

1,995,236

UNITED STATES PATENT OFFICE 1,995,236

VEHICLE SIGNAL

Vicente M. Alcaraz, Santurce, Puerto Rico

Application October 6, 1931, Serial No. 567,288

14 Claims. (Cl. 177—337)

My invention relates to signalling means for automotive vehicles.

The objects of my invention are to provide for automatically illuminating, in connection with a headlight the surface of a roadway when a vehicle is rounding road curves or street corners to enable the driver to readily view obstructions or projections to reduce the possibility of accidents to a minimum; to simultaneously illuminate a stop light with a road curve light when the vehicle is rounding curves or corners to indicate caution to a driver approaching from the rear; positioning the head and road curve lights upon the fenders of the front wheels whereby such lights will be protected from mud and from being knocked off by passing vehicles or from an obstruction in the roadway or street; the continuous illumination of the headlight and the illumination of the road curve and stop lights when desired; the automatic illumination of the road curve and stop lights when rounding curves; simultaneously with the steering of the front wheels of the vehicle to round a road curve or street corner automatically illuminating the road curve and stop lights in unison and for simultaneously and automatically extinguishing the road curve and stop lights when the vehicle is steered straight away when completing the rounding of the road curve or street corner; cushioning the operating means for the circuit controlling devices for the road curve lights or road curve and stop lights to overcome the jarring thereof relative to the fenders when the vehicle front wheels are travelling over an uneven road surface or meet with an obstruction; and to attain these and other ends as will hereinafter appear in a strong, durable, thoroughly efficient, readily installed and comparatively inexpensive structure.

To the above ends essentially my invention consists of such parts and in such combination of parts as fall within the scope of the invention as claimed.

In the drawings:

Figure 1 is a fragmentary view in front elevation illustrating the arrangement relative to a wheel fender of a head and a pair of road curve lights forming elements of the mechanism.

Figure 2 is a sectional detail illustrating the cushioning or shock absorbing means for the actuating means of the circuit controlling devices.

Figure 3 is a front elevation of the circuit controlling device actuating means carrying the circuit opening and closing member, the latter being shifted to vertical position.

Figure 4 is a side elevation of the circuit controlling device actuating means.

Figure 5 is a detail in elevation of the carrier for the contact plate and circuit opening and closing member.

Figure 6 is an inverted plan view of the carrier shown in Figure 5.

Figure 7 is an elevation of the combined support and guide for the circuit connections.

Figure 8 is a diagrammatical view of one embodiment of the invention.

Figure 9 is an inverted plan of the contact member of the circuit opening and closing device and further illustrating in dotted lines the circuit connections.

Figure 10 is a view partly in vertical section and partly in elevation of a unit of the road curve light of the double type.

Figure 11 is an elevation of a unit of the road curve light of the single type.

Figure 12 is a diagrammatical view of another embodiment of the invention.

Figure 13 is an inverted plan of the contact member employed in the form shown by Figure 11.

Figure 14 is a fragmentary view in front elevation of an automotive vehicle showing a modified arrangement of road curve light.

Figure 15 is a vertical section upon an enlarged scale of the modified arrangement shown in Figure 14.

Figure 16 is an inverted plan of the contact plate employed in the modified arrangement shown in Figure 15.

Figure 17 is a diagrammatical view of the modified arrangement shown in Figure 15.

Figure 18 illustrates a modified form of contact member.

Figure 19 is a diagrammatical view of the modified arrangement shown in Figure 14 as set up with the plate shown by Figure 16.

Figure 20 is a rear elevation of an automotive vehicle provided with a plurality of stop lights.

Figure 21 is a view similar to Figure 3 with the addition of the circuit opening and closing member of the form shown in Figure 15.

Figure 22 is a fragmentary view inside elevation and partly in section showing a scout light assembly with respect to a front wheel and the fender for the latter.

Figure 23 is an inverted plan of the contact member.

Figure 24 is an edge view of the contact member.

Figure 25 is a top plan view of the circuit opening and closing member.

Figure 26 is a section on line 24—24, Figure 25.

Figure 27 is a side elevation of a front wheel, the fender for the latter and a scout light assembly.

The mechanism may include as a part thereof a pair of illuminating units, each including a head light, a pair of oppositely extending road curve lights angularly disposed with respect to the head light and stop light, or a head light, a road curve light on the outer side and angularly disposed with respect to the head light and a stop light or a shiftable road curve light and a stop light. Each unit also includes a circuit opening and closing device which is common to the road curve light or lights and the stop light thereof. The head light and road curve lights being mounted upon the fenders for the front wheels. Each circuit controlling device has associated therewith an actuating means therefor for the purpose of opening and closing the circuit and with such means operated from a front wheel of the vehicle when the wheel is steered from and to a straight direction of travel.

Referring to Figures 1 to 10 of the drawings, the signalling means includes a pair of like oppositely disposed units, only one of which is structurally shown. Each unit includes a sleeve like carrier 1 provided at its upper end with an outwardly directed annular flange 2. The carrier 1 has different outer diameters to provide spaced annular shoulders 3, 4. That part 5 of the outer periphery of carrier 1 extending from the shoulders 3 to flange 2 is threaded and of greater height and diameter than that of the part 6 of the periphery between shoulders 3, 4. The part 6 of the periphery between shoulders 3, 4 is smooth. That part 7 of the periphery of carrier 1 from shoulder 4 to the lower end of the carrier is threaded and of less diameter and of greater height than that part between the shoulders 3, 4. The inner face of carrier 1 is of polygonal contour. The carrier 1 in proximity to the flange 2 is provided with an opening 8.

The carrier 1 is positioned against the inner face of the top of the front wheel fender 9 and has its inner face register with an opening 10 formed in fender 9.

Each unit also includes a support 11 having arms 11' carrying a head light 12 and a pair of oppositely extending road curve or scout lights 13, 14 which are angularly disposed with respect to and on opposite sides of the head light 12. Depending from the support 11 is a hollow post 15 having the major portion of its length of the same contour as the inner face of the carrier to prevent the support rotating relative to the latter. The post 15 depends below the lower end of the carrier and its depending portion is threaded, as at 16. The support 11 is mounted upon the fender 9 and post 15 extends through opening 10 and carrier 1. Mounted on the threaded portion 16 of post 15 is a clamping nut 17 which in connection with the carrier 1 and support 11 clamps the carrier and support in an upright position to fender 9. The nut 17 also performs an additional function to be hereinafter referred to.

Each unit further includes a circuit opening and closing device consisting of a split annular contact member 18 which threadedly engages with part 5 of carrier 1. The split in member 18 is indicated at 19 and is provided for the passage of circuit connections through opening 8 to the head and road curve lights. The lower part of member 18 is formed with a pair of spaced electrical contacts 20, 21 in the form of depending arcuate ribs. The member 18 is formed of non-conducting material. Threadedly engaging with the part 5 of carrier 1 is a spacer 22 which abuts the lower face of contact member 18 inwardly of the contacts 20, 21. Mounted to revolve around the part 6 of carrier 1 is a circuit opening and closing member 23 of non-conducting material and which is provided with an electrical contact 24 for selective engagement with a contact 20 or 21 for the purpose of illuminating a road curve or scout light. The member 23 abuts shoulder 3. Threadedly engaging with the part 7 of carrier 1 and abutting and extending from shoulder 4 is a retainer 25 coacting with shoulder 3 to retain member 23 in position. Interposed between nut 17 and retainer 25 and threadedly engaging with part 7 of carrier 1 is a binder nut 26 for retainer 25. The nut 17 functions as a clamp for nut 26. Encompassing members 18, spacer 22, member 23, retainer 25, nuts 26, 17 and depending from post 15 is a revoluble open top, protective casing 27 provided with an outwardly directed annular flange 28 at its top and a discharge opening 29 in its bottom. The casing 27 abuts the edge of member 23 and is fixedly secured thereto by holdfast means 30.

Secured to the lower face of the fender 9, by the holdfast means 31 is a combined support and guide element 32 for the circuit connections 33, 34 and 35. The element 32 is of annular form and channel shaped in vertical sections. The channel opening outwardly. The element 32 is formed with openings 36, 36' and 36" for the passage of the circuit connections 33, 34 and 35 respectively. The element 32 surrounds and is positioned in close proximity to the flange of casing 27.

The circuit connections 33, 35 extend from a switchboard 36 on the vehicle for the purpose of coupling such connections to a source of electrical supply. The circuit connection 33 leads to the head light 12. The circuit connection 35 leads to the contact 24. Extending from contact 20 to road curve or scout light 13 is a circuit connection 37. The road curve or scout light 14 is connected to a stop light 38 by circuit connection 34. In lieu of coupling each unit to one of the stop lights 38, both can be coupled to a single stop light 42. Extending from the contact 21 to the circuit connection 34 is a circuit connection 43. The arrangement shown provides for making active a stop light simultaneously with the activity of the road curve or scout light that is turned towards the outside of the vehicle.

The circuit opening and closing devices are simultaneously operated to selectively make active a road curve or scout light of both units when the vehicle is steered to round a road curve or a street corner by means actuated from the front wheels of the vehicle. The actuating means for each circuit opening and closing device is alike and it comprises an upstanding lever arm 44 having a lower perpendicular part 45 and an inwardly inclined upper part 46. The part 45 is fixedly secured to the brake drum 47 of the front wheel 48 by the holdfast means 49. The upper end of part 46 terminates into a horizontally disposed rectangular casing 50 having an opening 51 in its top. Within casing 50 is arranged a pair of oppositely disposed endwise opposed spring controlled slidable blocks 52 having the opposed end faces formed with semi-circular grooves 53 and beveled surfaces 54. The controlling springs for the blocks 52 are indicated at 55. Mounted in the grooves 53 is the spherical end 56 of an angularly disposed and outwardly directed plunger 57 formed with a lengthwise extending peripheral groove 58 having an outer open end. Mounted on the plunger 57 is a cylinder 59 which is open at its inner end. The plunger 57 and cylinder 59 are slidable relative to each other. Secured to opposite sides of the cylinder 59 at its inner end are the inner ends of a pair of oppositely extending curved arms 60 providing a shifting yoke for the casing 27, the latter in turn will revolve the member 23 about the carrier 1. The casing 27 has a pair of diametrically opposed oppositely extending stub shafts 61 upon which the outer ends of the arms 60 are pivotally mounted and confined thereon. A flexible protective covering 62 is provided for the casing 50 and inner end of cylinder 59. The parts 50 to 59 provide a cushioning or shock absorbing medium for the operating means for the circuit opening and closing device. The parts 50 to 59 constitute a universal joint connection between the arm 44 and piston 57. When the wheel 48 is steered outwardly the operating means for the circuit opening and closing device will be operated in a direction to shift member 23 to move contact 24 to engage contact 21 whereby light 14 will become active and when wheel 48 is steered inwardly contact 24 will be brought to engage contact 21 and make light 13 active.

With reference to Figures 11 to 13, the unit is illustrated as comprising a head light 63 and a single road surface or scout light 64, under such conditions the member 65, which corresponds to member 18 is provided with one contact 66. In this form only the circuit connections 33, 34, 35 and 43 are used.

Referring to Figures 14 to 17 each unit does not include a head light. The unit only includes a single road curve or scout light 63' which is mounted in a manner to be shifted to a position in the direction to which the front wheel of the vehicle is steered. The light 63' is carried by a support 64' provided with a hollow post 65' formed with a cylindrical smooth part 66', a polygonal part 67 and a peripherally threaded part 68. The diameter of the parts 66' and 68 relative to the part 67 is such to provide shoulders 69, 70. Extending through the opening 10 in fender 9 is a carrier 71 provided with a flange 72 at its top which seats on fender 9. The part 65' extends through and is of greater length than carrier 71. The support 64' seats upon the flanged end of carrier 71 and the latter below its flange is peripherally threaded. Secured to the carrier 71 and abutting flange 72 is a contact member 73 of non-conducting material formed with a pair of spaced contacts 74, 75 in circuit with the light 63'. Secured to the carrier 71, abutting member 73 and positioned inwardly of contacts 74, 75 is a spacer 76, and the latter not only holds member 73 but couples the carrier 71 to the fender. The circuit opening and closing element which associates with the contacts 74, 75 includes an inner section 77 in the form of an annulus having its inner edge of polygonal contour to correspond to the shape of part 67 of the post 65. The section 77 fits the part 67 and is formed with an upstanding collar 78 which encompasses the spacer 76. Surrounding and secured to section 77 is an outer section 79 in the form of an annulus. The section abuts the shoulder 69 and the bottom of carrier 71. Threadedly engaging with part 67 of post 65 is a retainer 80 for section 77 and which abuts shoulder 70. A clamping nut 81 abuts retainer 80 and is secured to part 67 of post 65. The section 79 is formed with a contact 82 for selective engagement with contacts 74, 75. The circuit connections for the road curve or scout light 63' are indicated at 83.

The operating means for the circuit opening and closing device which associates with the road curve or scout light is the same as that shown in Figure 1.

In Figures 18 and 19 the contact member 84 which corresponds to contact member 73 is formed with but a single contact 85. The circuit connections employed, when but a single contact 85 is used are indicated at 86 and which associate with the road curve or scout light 87.

In the forms shown in Figures 17 and 18 the circuit arrangement is such as to make a stop light active when light 63' or 87 is active. The support 64' may be provided with a cutout 88 to prevent the activity of light 63', but at the same time permitting of the action of the stop light.

The lights 63' and 87 will be moved to the right or left on the steering of the front wheel of the vehicle, but light 63' will become active when moved either to the right or left. While light 87 will be active only when moved to the side it is placed on the vehicle; that is: when moved to the right if placed on the right side of the vehicle, or to the left if placed on the left side of the vehicle.

Rear stop lamps will also have independent-direct-electric-wire connections, connected each with one of two electrical buttons, placed on the steering wheel of the vehicle, to light one or the other of the rear stop lamps at the will of the operator before the curve is taken.

What I claim is:—

1. In signalling means for automotive vehicles, the combination with the front wheels of the vehicle, the fenders for said wheels, said fenders being formed with high parts, a pair of normally inactive signals for positioning at the rear of the vehicle, and two pair of normally inactive scout lights, each pair of scout lights arranged over a fender high part and consisting of an outer and an inner one disposed at opposite inclinations with respect to each other in directions towards the sides of a fender, of a vertically disposed supporting structure for each pair of scout lights mounted on and having a depending portion extending through a fender high part, a pair of normally open lighting circuits, each consisting of a pair of circuit conductors extending through a supporting structure to a pair of scout lights and a circuit conductor leading from the outer scout light of a pair to one of the signals of said pair, a pair of controlling devices mounted about said portions and common to said circuits, means for anchoring said devices and structures with said fenders, each of said devices including a stationary element provided with a pair of spaced contacts electrically connected to a pair of circuit conductors and a revoluble element shiftable in opposite directions for electrically bridging said contacts to close a lighting circuit, said elements opposing each other and encompassing the depending portion of a supporting structure, a power line common to said lighting circuits and electrically connected to said revoluble elements, and oppositely movable shiftable mechanism for said revoluble elements, said mechanisms being connected with said revoluble elements and with the front wheels of the vehicle and operated simultaneously on the steering of said front wheels for shifting said revoluble elements in directions to make active an inner scout light of one pair, or the outer scout light of the other pair and one of said signals.

2. A signalling means as set forth in claim 1 having each shiftable mechanism formed of a lower section and an upper section extended outwardly at an angle to and pivotally connected to said upper section.

3. A signalling means as set forth in claim 1 having each shiftable mechanism formed of a lower section, an upper section and a universal pivotal connecting means between said sections.

4. A signalling means as set forth in claim 1 having each shiftable mechanism formed of a non-extendible lower section, an extendible telescopic upper section and a universal pivotal connecting means between said sections.

5. A signalling means as set forth in claim 1, combined with vertically disposed open top tubular revoluble members, each arranged below a fender, enclosing and providing a protector for a controlling device and the depending portion of a supporting structure, said members being connected with said mechanisms and revoluble elements and bodily revolving with the latter.

6. In signalling means for automotive vehicles, the combination with the front wheels of the vehicle, the fenders of said means, a pair of normally inactive signals for positioning at the rear of the vehicles, a pair of normally inactive scout lights arranged above said fenders and extending at outward inclinations with respect to said fenders, of a pair of vertically disposed supporting structures for the scout lights mounted on and having depending portions extending through said fenders, a normally open lighting circuit common to a signal and a scout light consisting of a pair of circuit conductors extending through a supporting structure to a scout light and a circuit conductor extending from a scout light to one of said signals, a controlling device for each lighting circuit mounted upon a depending portion of a supporting structure and consisting of a stationary element provided with a pair of spaced contacts electrically connected to a pair of circuit conductors and a revoluble element shiftable to a position to electrically bridge said pair of contacts to close a lighting circuit, a power line common to said lighting circuits and electrically connected to said revoluble elements, oppositely movable shiftable mechanisms being connected with said revoluble elements, and means connected to said front wheels and to said mechanisms and operated simultaneously on the steering of said front wheels for shifting said revoluble elements in unison in directions to make active simultaneously a scout light and that signal connected to such light.

7. A signalling means as set forth in claim 6, combined with vertically disposed open top tubular revoluble members, each arranged below a fender, enclosing and providing a protector for a controlling device and the depending portion of a supporting structure, said members being connected with said mechanisms and revoluble elements and bodily revolving with the latter.

8. A signalling means as set forth in claim 6, having each of the shifting mechanisms formed of a lower section and an upper section angularly disposed outwardly with respect to the lower section and a universal pivotal connecting means between said sections.

9. In a signalling means for motor vehicles of that type controlled by and on the steering of the front wheel of the vehicle, in combination a fender for the front wheel having a high part, a signal, a supporting structure for the signal mounted upon and having a post depending through said high part, a normally open operating circuit for the signal extending through said structure to the signal, a stationary annulus mounted about said post and formed with a pair of spaced contacts interposed in said circuit, an oppositely revoluble annulus mounted about said post and provided with contact means for engagement with said contacts, when the revoluble annulus moves in one direction to close said circuit thereby making the signal active, means for retaining the annulii upon the post and for anchoring said structure to said high part, a power line circuit electrically coupled to said contact means, a vertically disposed revoluble protector common to said annulii, post and retaining means and connected to said revoluble annulus for operating it and means for connecting said protector to the front wheel of the vehicle to provide for the revolving of the revoluble annulus on the steering of the wheel.

10. In a signalling means for motor vehicles of that type controlled by and on the steering of the front wheel of the vehicle, in combination a fender for the front wheel having a high part, a signal, a supporting structure for the signal mounted upon and having a post depending through said high part, a normally open operating circuit for the signal extending through said structure to the signal, a stationary annulus mounted about said post and formed with a pair of spaced contacts interposed in said circuit, an oppositely revoluble annulus mounted about said post and provided with contact means for engagement with said contacts, when the revoluble annulus moves in one direction to close said circuit thereby making the signal active, means for retaining the annulii upon the post and for anchoring said structure to said high part, a power line circuit electrically coupled to said contact means, a vertically disposed revoluble protector common to said annulii, post and retaining means and connected to said revoluble annulus for operating it, and an operating mechanism for and connected to said revoluble protector, said mechanism being connected to said front wheel and having its operation dependent upon the steering of said wheel.

11. A signalling means in accordance with claim 10 having said mechanism formed of a lower section for connection to the front wheel, an upper section connected to the revoluble protector and a universal pivotal connection between said sections.

12. A signalling means in accordance with claim 1, combined with vertically disposed open top tubular revoluble members, each arranged below a fender, enclosing and providing a protection for a controlling device and depending portion of a supporting structure, said members being connected with said mechanisms and revoluble elements and bodily revolving with the latter, and annular members depending from the fenders and encompassing the upper end of said tubular members, said annular members being provided with apertures for the passage of circuit connections of the lighting and power circuits.

13. A signalling means in accordance with claim 6 combined with vertically disposed open top tubular revoluble members, each arranged below a fender, enclosing and providing a protector for a controlling device and the depending portion of a controlling device, said members being connected with said mechanisms and revoluble elements and bodily revolving with the latter, and annular members depending from the fenders and encompassing the upper end of said tubular members, said annular members being provided with apertures for the passage of circuit connections of the lighting and power circuits.

14. A signalling means in accordance with claim 9, combined with an annular member depending from the fender and encompassing the upper end of said protector, said annular member having means for the passage of circuit connections of said power line.

VICENTE M. ALCARAZ.